US010294720B2

(12) United States Patent
Nguyen et al.

(10) Patent No.: US 10,294,720 B2
(45) Date of Patent: May 21, 2019

(54) ERGONOMIC LADDER

(71) Applicant: THE BOEING COMPANY, Chicago, IL (US)

(72) Inventors: David G. Nguyen, Everett, WA (US); Florante M. Halili, Renton, WA (US); Benjamin Bowen Lee, Tacoma, WA (US); Jesse A. Webb, Bothell, WA (US); John F. Jenkins, Everett, WA (US)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 15/629,911

(22) Filed: Jun. 22, 2017

(65) Prior Publication Data

US 2018/0371835 A1 Dec. 27, 2018

(51) Int. Cl.

| | |
|---|---|
| ***E06C 1/38*** | (2006.01) |
| ***E06C 7/08*** | (2006.01) |
| ***E06C 1/04*** | (2006.01) |
| ***B64F 5/60*** | (2017.01) |

(52) U.S. Cl.

CPC .................. *E06C 1/38* (2013.01); *B64F 5/60* (2017.01); *E06C 1/04* (2013.01); *E06C 7/083* (2013.01); *E06C 7/082* (2013.01)

(58) Field of Classification Search

CPC ... E06C 1/38; E06C 1/04; E06C 7/083; E06C 7/082

See application file for complete search history.

(56) References Cited

U.S. PATENT DOCUMENTS

| | | | | | |
|---|---|---|---|---|---|
| 1,314,201 | A * | 8/1919 | Moore | E06C 1/383 182/159 |
| 2,192,521 | A * | 3/1940 | McGaw | E06C 7/083 182/228.3 |
| 2,975,857 | A * | 3/1961 | Suroff | E06C 7/44 182/166 |
| 3,871,481 | A * | 3/1975 | Ballek | E06C 1/38 182/151 |
| 4,463,829 | A | 8/1984 | Grin | |
| 4,815,564 | A | 3/1989 | Yoo | |
| 6,145,621 | A | 11/2000 | Nye | |
| 8,443,938 | B2 | 5/2013 | Furseth et al. | |
| 9,027,711 | B2 | 5/2015 | Lonergan et al. | |
| 9,068,394 | B1 | 6/2015 | Geiselman, III | |

(Continued)

*Primary Examiner* — Alvin C Chin-Shue

(74) *Attorney, Agent, or Firm* — Philip S. Hof; The Small Patent Law Group, LLC

(57) ABSTRACT

A ladder includes a pair of generally curved side rails arranged in a spaced apart manner, a plurality of fixed rungs disposed between the side rails, a plurality of pairs of rung supports, and a plurality of hinged rungs. Each of the pairs of rung supports is horizontally aligned with each other and disposed on respective inner sides of the side rails. The rung supports are spaced apart from the fixed rungs along lengths of the side rails. Each rung support includes a flanged end portion having an aperture therein. Each hinged rung is associated with a respective pair of rung supports. Each hinged rung has a first end pivotally coupled to the flanged end portion of a first rung support in the respective pair of rung supports such that each hinged rung is pivotal between a secured position between the rung supports and a retracted position.

23 Claims, 8 Drawing Sheets

(56) References Cited

U.S. PATENT DOCUMENTS

| | | | | |
|---|---|---|---|---|
| 2001/0017233 | A1* | 8/2001 | Panzeri | E06C 7/087<br>182/228.6 |
| 2003/0221910 | A1* | 12/2003 | Huang | E06C 1/18<br>182/163 |
| 2004/0251083 | A1* | 12/2004 | Leipziger | E06C 1/39<br>182/228.2 |
| 2009/0107768 | A1* | 4/2009 | McCoolidge | E06C 1/32<br>182/207 |
| 2010/0258379 | A1* | 10/2010 | Mickens | B60R 3/00<br>182/111 |
| 2013/0037350 | A1* | 2/2013 | Geiselman, III | E06C 1/383<br>182/108 |
| 2016/0258214 | A1* | 9/2016 | Ambriz | E06C 5/02 |

* cited by examiner

ERGONOMIC LADDER

FIELD OF EMBODIMENTS OF THE DISCLOSURE

Embodiments of the present disclosure generally relate to an ergonomic ladder apparatus which can be used for assembling an aircraft.

BACKGROUND OF THE DISCLOSURE

The fuselage of commercial aircraft includes fuselage portions or sections that are individually assembled and then coupled or attached together to form the fuselage. The assembly of the fuselage portions includes various work tasks along the exterior surface of the fuselage portions, such as drilling, counter-sinking, and installing rivets. Due to the relatively large height and curvature of the fuselage portions, some exterior areas of the fuselage portions may be difficult to access for a mechanic. Therefore, mechanics often climb ladders to access the difficult areas of the fuselage portions during the manufacturing of the aircraft.

However, conventional ladders used for aircraft assembly have several drawbacks. For example, in order to access a working zone which may include a line of holes to be drilled and filled with fasteners, such as rivets, a mechanic typically positions the ladder adjacent to the working zone and leans over a side of the ladder to reach the working zone. The mechanic does not place the ladder in-line with the working zone because the rungs of the ladder interfere with the mechanic's access to the working zone, such as by obstructing the positioning and use of the mechanic's tools. There are several drawbacks associated with the mechanic adopting such awkward body posture of leaning over the side of the ladder, including a risk of injury to the mechanic's wrist, shoulder, and back, and a risk of reduced work quality, such as drilling crooked holes or damaging the exterior surface of the fuselage, both of which are later rectified (thereby prolonging the manufacturing process). Another disadvantage associated with the conventional ladders used for aircraft assembly is the weight of the ladders, which may exceed 65 pounds. Due to the large sizes of the fuselage portions, a mechanic may be tasked with carrying a ladder for hundreds of feet at a time, such as to move from one side of the fuselage portion to the other side, which can lead to injury. In addition, setting up the heavy ladders may require the effort of more than one person, which draws people from other work tasks, thereby reducing workplace efficiency.

Accordingly, known ladders used during the assembly of aircraft are heavy and obstruct access to the area of the aircraft directly behind the ladder, which may cause a mechanic to adopt an awkward body posture in which the mechanic reaches outward over a side of the ladder to work on an area adjacent to the ladder.

SUMMARY OF THE DISCLOSURE

A need exists for a ladder apparatus that is lightweight for ease of handling the ladder by a single mechanic. A need also exists for a ladder that allows a mechanic to selectively access the area or zone of the exterior surface of the aircraft directly behind the ladder, allowing the mechanic to work within the space between the two side rails of the ladder without reaching outside of the side rails of the ladder.

With those needs in mind, certain embodiments of the present disclosure provide a ladder that includes a pair of generally curved side rails arranged in a spaced apart manner, a plurality of fixed rungs disposed between the side rails, a plurality of pairs of rung supports, and a plurality of hinged rungs. Each of the pairs of rung supports is horizontally aligned with each other and disposed on respective inner sides of the side rails. The rung supports are spaced apart from the fixed rungs along lengths of the side rails. Each rung support includes a flanged end portion having an aperture therein. Each hinged rung is associated with a respective pair of rung supports. Each hinged rung has a first end pivotally coupled to the flanged end portion of a first rung support in the respective pair of rung supports such that each hinged rung is pivotal between a secured position between the rung supports and a retracted position.

In at least one embodiment, each hinged rung has an opposite, second end configured to be releasably secured via a latch to the flanged end portion of a second rung support in the respective pair of rung supports. Optionally, the first rung support of each of the pairs of rung supports may include a torsion spring that engages the first end of the associated hinged rung and biases the hinged rung towards the retracted position.

In at least one embodiment, the side rails, the fixed rungs, and/or the hinged rungs are composed of a fiber-reinforced polymer composite material. The hinged rungs and the fixed rungs may include anti-skid pads bonded to respective top surfaces of the hinged and fixed rungs. The anti-skid pads may be composed of polyurethane and have a durometer between about 60 and about 80.

Certain embodiments of the present disclosure provide a method of manufacturing a ladder that includes forming a pair of generally curved side rails, a plurality of fixed rungs, and a plurality of hinged rungs out of a fiber-reinforced polymer composite material. The method includes arranging the pair of side rails to extend parallel to each other in a spaced apart manner, and mounting the fixed rungs to the side rails such that the fixed rungs extend between the side rails. The method also includes mounting a plurality of pairs of rung supports to the side rails such that the rung supports are spaced apart from the fixed rungs along lengths of the side rails. Each of the pairs of rung supports is horizontally aligned with each other and disposed on respective inner sides of the side rails. The method further includes pivotally coupling a first end of each of the hinged rungs to a first rung support in a pair of rung supports associated with the respective hinged rung. Each hinged rung is pivotal relative to the side rails between a secured position and a retracted position.

Certain embodiments of the present disclosure provide a ladder that includes a pair of generally linear side rails arranged in a spaced apart manner, a plurality of fixed rungs disposed between the side rails, a plurality of pairs of rung supports, and a plurality of hinged rungs. Each of the pairs of rung supports is horizontally aligned with each other and disposed on respective inner sides of the side rails. The rung supports are spaced apart from the fixed rungs along lengths of the side rails. Each rung support includes a flanged end portion having an aperture therein. Each hinged rung is associated with a respective pair of rung supports. Each hinged rung has a first end pivotally coupled to the flanged end portion of a first rung support in the respective pair of rung supports such that each hinged rung is pivotal between a secured position and a retracted position.

DETAILED DESCRIPTION OF THE DISCLOSURE

Figure 1:
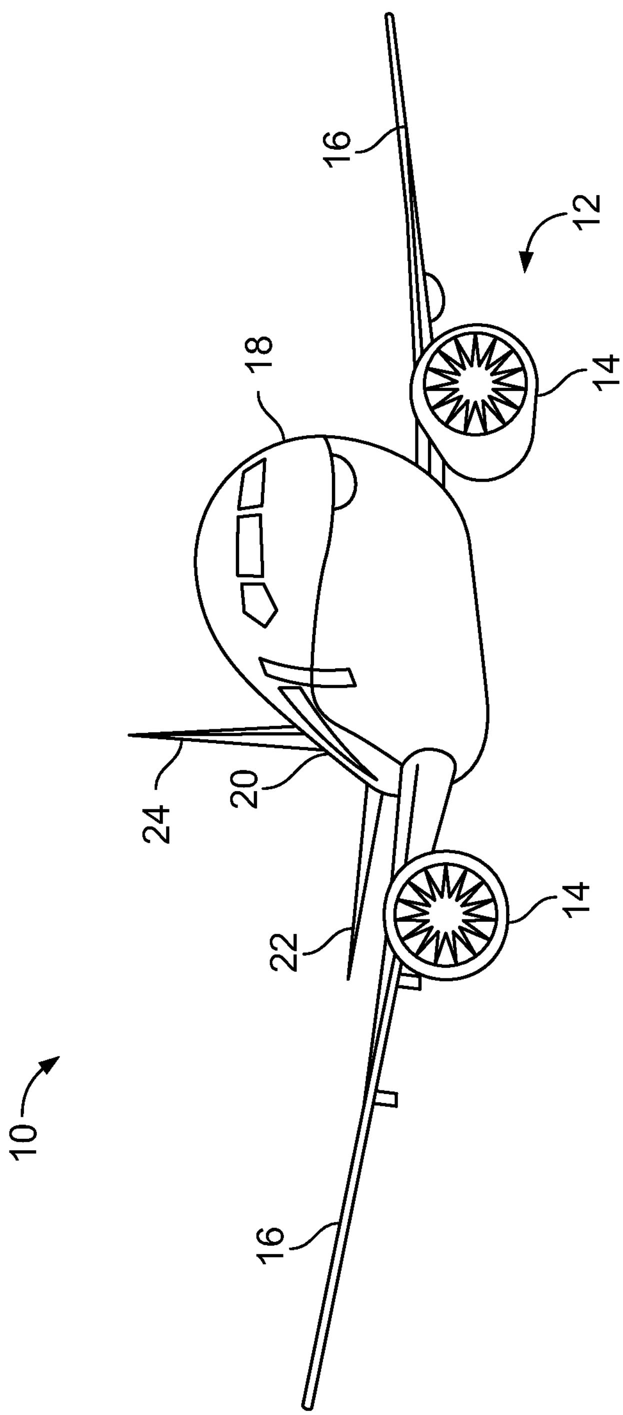
FIG. 1 is a diagrammatic representation of a front perspective view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide an ergonomic ladder with hinged rungs that are retractable. The hinged rungs can be used as typical fixed rungs when the hinged rungs are in a secured position between two side rails of the ladder. Upon selectively retracting a hinged rung, the hinged rung pivots about a rung support at one of the two side rails such that the hinged rung uncouples from the other side rail. The hinged rung swings or flips up to a retracted position that provides a large gap or window between the side rails and the adjacent rungs above and below the retracted hinged rung. An operator standing on the ladder, such as a mechanic, can reach through the gap to access a working zone directly behind the ladder and between the side rails, without having to reach laterally outside of the side rails, which may otherwise cause a body posture that exposes the operator to risk of injury to a wrist, shoulder, and/or back. The ergonomic ladder may have a curved shape that complements the curved fuselage of an aircraft. The gap allows a mechanic to drill, counter-sink, and install fasteners onto the exterior surface of the aircraft.

In certain embodiments, the hinged rungs of the ergonomic ladder are mounted to the side rails via a spring-loaded hinge system designed to apply a pre-loaded force that will assist the hinged rungs in pivoting from the secured position to the retracted position. The spring-loaded hinge system may also retain the hinged rungs at the retracted positions until the mechanic manually forces the hinged rung to swing to the secured position.

In certain embodiments, the hinged rungs are configured to self-lock in the secured position upon moving from the retracted position to the secured position via a latching mechanism. The latching mechanism allows mechanics to unlock or release the hinged rung with little effort by activating a switch, such as a lever, button, or latch handle. The spring-loaded hinge system and the easy release and self-locking latching mechanism are designed to be user-friendly, allowing the mechanic to carry tools or parts while manipulating the hinged rungs.

The ergonomic ladder may also be formed at least partially of a fiber-reinforced polymer composite material for reduced weight relative to known aluminum ladders. In certain embodiments, in order to increase structural integrity and longevity of the ladder, rung supports of the ladder that engage the rungs are mounted to the side rails of the ladder using clamp fittings. Each clamp fitting extends through one of the side rails from an outer side of the side rail and is fastened to a rung support disposed along an inner side of the side rail, such that the clamp fitting and the rung support effectively sandwich the side rail therebetween. The clamp fittings may have a shape that provides increased contact surface with the side rail, such as a lemniscate shape (e.g., dumbbell or dog bone). Mounting the rung supports to the side rails using the clamp fittings provide load distribution and reduce movement of the rung support relative to the side rail (which reduces degradation over time at the coupling interface).

FIG. 1 is a diagrammatic representation of a front perspective view of an aircraft 10 (or aircraft assembly), according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an interior cabin, which may include a cockpit, one or more work sections (for example, galleys, personnel carry-on baggage areas, and the like), one or more passenger sections (for example, first class, business class, and economy sections), and an aft section. Each of the sections may be separated by a cabin transition area, which may include one or more class divider assemblies. Overhead stowage bin assemblies may be positioned throughout the interior cabin.

Although some embodiments of the present disclosure are directed to use of a ladder along the exterior surface of an aircraft, it is recognized that the embodiments of the ladder described herein are not limited to use with an aircraft. The ladder according to the embodiments described herein may be used for climbing various other curved structures, such as tanker trucks, silos, cement trucks, smokestacks, etc., and even non-curved structures.

Figure 2:
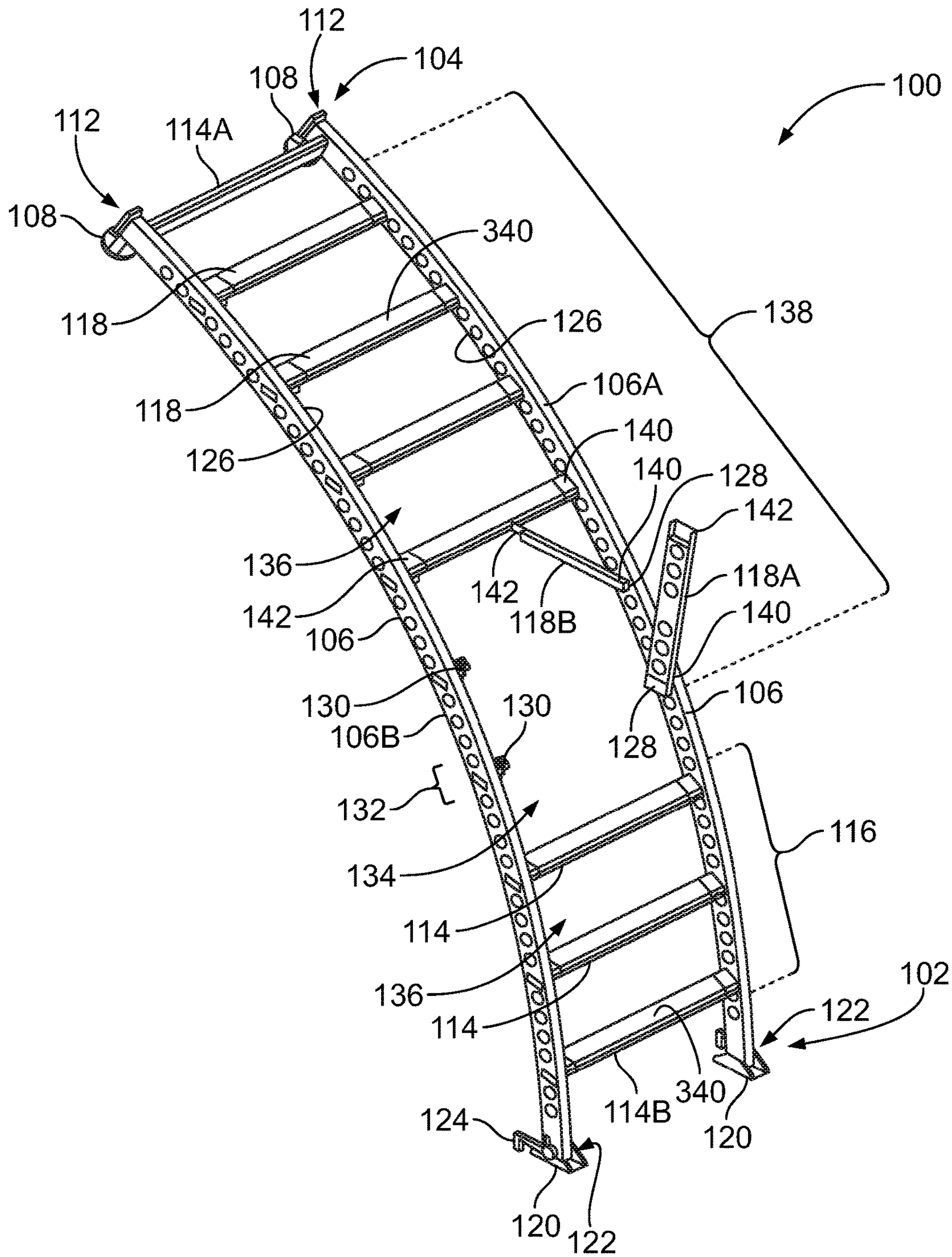
FIG. 2 is a perspective view of an ergonomic ladder, according to an embodiment of the present disclosure.

FIG. 2 is a perspective view of an ergonomic ladder 100 according to an embodiment of the present disclosure. The ergonomic ladder 100 is also referred to herein as ladder 100. The ladder 100 includes a lower end 102 and an upper end 104. The lower end 102 is supported by the floor or ground, while the upper end 104 engages a work structure, such that a fuselage 18 of the aircraft 10 shown in FIG. 1. The ladder 100 includes two side rails 106. The side rails 106 are spaced apart from each other and extend parallel to each other. Optionally, the two side rails 106 may have identical shapes and material properties. In the illustrated embodiment, the side rails 106 are generally curved or arced along the lengths of the side rails 106 between the lower end 102 and the upper end 104. The curve of the side rails 106 may complement the curve of the fuselage 18, such that the side rails 106 maintain a generally uniform distance from an exterior surface of the fuselage 18.

Figure 3:
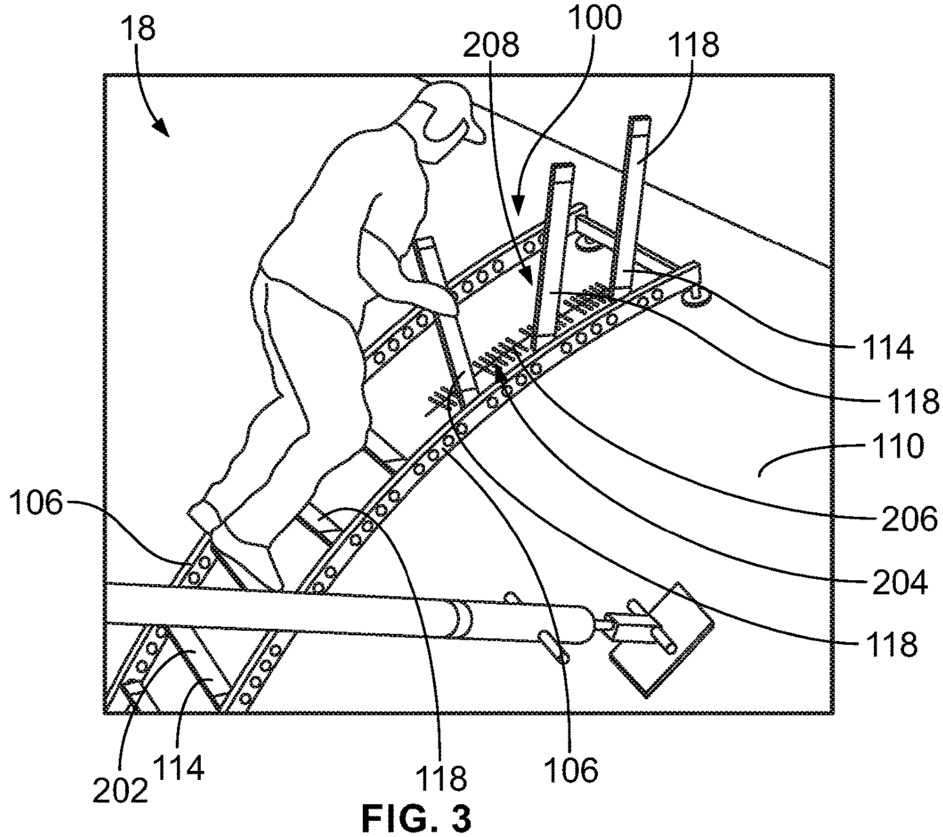
FIG. 3 illustrates a mechanic standing on the ladder that is formed according to an embodiment of the present disclosure.

The ladder 100 in the illustrated embodiment includes frictional feet 108 mounted to the side rails 106 at the upper end 104. The frictional feet 108 are disc-shaped and include rubberized pads that face away from the side rails 106. The rubberized pads and are configured to engage the exterior surface 110 of the fuselage 18, as shown in FIG. 3, to frictionally secure the upper end 104 of the ladder 100 in place relative to the fuselage 18. The rubberized pads of the frictional feet 108 also reduce the risk of the ladder 100 damaging the exterior surface 110 of the fuselage 18. In an embodiment, each side rail 106 includes one frictional foot 108 mounted to a top end 112 of the respective side rail 106.

The ladder 100 also includes swivel feet 120 at the lower end 102. Each side rail 106 includes a swivel foot 120 mounted to a bottom end 122 of the respective side rail 106. The swivel feet 120 are configured to engage the ground or floor, and may include a frictional surface for gripping the ground or floor. The ladder 100 optionally includes hooks 124 at the bottom ends 122 of the side rails 106. The hooks 124 are configured to couple to a mounting component, such as an edge of the floor, to secure the lower end 102 of the ladder 100 in place relative to the ground or floor.

The ladder 100 also includes a plurality of fixed rungs 114 disposed between the side rails 106. Each of the fixed rungs 114 is secured to both of the side rails 106. The fixed rungs 114 maintain the structural integrity of the ladder 100 by linking the two side rails 106 together and maintaining the distance between the side rails 106. Once the ladder 100 is assembled and functional, the fixed rungs 114 are fixed in position and do not move relative to either of the side rails 106. The fixed rungs 114 are disposed at different locations along the length of the ladder 100. For example, a first fixed rung 114A is located at, or at least proximate to (e.g., within six inches of), the upper end 104 of the ladder 100. The fixed rung 114A is the upper-most rung in the ladder 100. A second fixed rung 114B is located at, or at least proximate to (e.g., within twelve inches of), the lower end 102 of the ladder 100, and is the lower-most rung in the ladder 100. Although in one or more embodiments the ladder 100 may include only the two fixed rungs 114A, 114B, the ladder 100 may include additional fixed rungs 114. In the illustrated embodiment, the ladder 100 includes two additional fixed rungs 114 adjacent to the lower-most rung 114B along a lower portion 116 of the ladder 100.

The ladder 100 also includes multiple hinged rungs 118 disposed between the side rails 106. The hinged rungs 118 are spaced apart from the fixed rungs 114 along the lengths of the side rails 106. The hinged rungs 118 may be similar or identical to at least some of the fixed rungs 114 in shape and/or material composition, but are not immovably fixed to the side rails 106. Rather, the hinged rungs 118 are configured to be selectively, individually pivotable relative to the side rails 106 between a secured position and a retracted position. In the secured position, a given hinged rung 118 extends between and engages the two side rails 106, similar to the fixed rungs 114. In the retracted position, the hinged rung 118 is spaced apart from one of the two side rails 106, while remaining coupled to the other side rail 106. The hinged rungs 118 are configured to pivot or swing from the secured position to the retracted position. When in the retracted position, a window or gap 134 is formed that is defined laterally between the side rails 106 and longitudinally between adjacent intact rungs 114, 118 on either side of the retracted hinged rung 118. The window 134 is greater than the gap 136 defined between adjacent intact rungs 114, 118, so a mechanic on the ladder 100 is better able to access the space directly behind the ladder 100.

In the illustrated embodiment, the ladder includes multiple hinged rungs 118 disposed side-by-side along an upper portion 138 of the ladder 100. The upper portion 138 is discrete from (e.g., does not overlap) the lower portion 116 along the length of the ladder 100. Most of the hinged rungs 118 are shown in the secured position, but one hinged rung 118A is shown in the retracted position, and an adjacent hinged rung 118B is shown in an intermediate or transition position between the secured and retracted positions. As the hinged rungs 118 are pivoted to the retracted position, the rungs 118 swing generally upwards and/or towards the mechanic on the ladder 100. Therefore, there is no risk of the rungs 118 knocking into and damaging the fuselage 18 behind the ladder 100. In at least one embodiment, the hinged rungs 118 pivot at least 90° from the secured position to the retracted position. For example, from a horizontal orientation in the secured position, the hinged rungs 118 pivot to at least a vertical or upright orientation, and possibly beyond the vertical orientation (e.g., beyond 90°), to the retracted position.

The hinged rungs 118 are mounted to the side rails 106 via rung supports 128, 130 disposed along inner sides 126 of the side rails 106. The inner sides 126 of the side rails 106 face each other. The rung supports 128, 130 include first rung supports 128 and second rung supports 130 that are arranged in pairs 132. In each pair 132, the first and second rung supports 128, 130 are horizontally aligned. The pairs 132 of rung supports 128, 130 are spaced apart from the fixed rungs 114 along the length of the ladder 100.

Each of the pairs 132 of rung supports 128, 130 is associated with a respective hinged rung 118. For example, a first end 140 of the respective hinged rung 118 is pivotally coupled to the first rung support 128. An opposite, second end 142 of the hinged rung 118 is releasably secured to the second rung support 130. The second end 142 engages the second rung support 130 when the hinged rung 118 is in the secured position, and is spaced apart from the second rung support 130 when the hinged rung 118 is in the retracted position. The first end 140 of the hinged rung 118 remains in engagement with the first rung support 128 regardless of the position of the hinged rung 118. As used herein, the first rung supports 128 are referred to as pivoting rung supports 128, and the second rung supports 130 are referred to as locking rung supports 130. In the illustrated embodiment, all of the pivoting rung supports 128 are mounted to the side rail 106A, and all of the locking rung supports 130 are mounted to the other side rail 106B. Therefore, all of the hinged rungs

118 move in the same direction from the secured position to the retracted position. The consistency and uniformity of the hinged rungs 118 reduces confusion for the mechanic on the ladder 100 when manipulating the hinged rungs 118. In an alternative embodiment, the hinged rungs 118 may be reversed such that the pivoting rung supports 128 are mounted to the side rail 106B.

FIG. 3 illustrates a mechanic standing on the ladder 100 that is formed according to an embodiment of the present disclosure. As used herein, the term "mechanic" is broadly used to refer to any person carrying, standing on, or otherwise manipulating the ladder 100. In the illustrated embodiment, the ladder 100 is positioned on the exterior surface 110 of a fuselage 18 of an aircraft 10 (shown in FIG. 1). As shown in FIG. 3, the mechanic has two hinged rungs 118 in the retracted position and the mechanic is manually moving an adjacent hinged rung 118 between the retracted and secured positions. FIG. 3 shows that the mechanic can manually move the hinged rungs 118 individually between the secured and retracted positions. The remaining hinged rungs 118 below the rung 118 held by the mechanic are in the secured position. The hinged rungs 118, when in the secured position, are effectively equivalent to the fixed rungs 114. For example, the mechanic can stand on the fixed rungs 114 and the hinged rungs 118 that are in the secured position when working on the fuselage 18 and/or climbing the ladder 100. Each of the fixed rungs 114 and the hinged rungs 118 in the secured position may be configured to support loads of at least 400 pounds, such as up to or exceeding 500 pounds. The fixed rungs 114 and the hinged rungs 118 have planar top surfaces 202 that can be stood upon by the mechanic. The top surfaces 202 may be relatively broad, such as having widths of at least two inches, such as about three inches or more, that reduce the amount of pressure on the mechanic's foot relative to narrower rungs in conventional ladders.

In the illustrated embodiment, the three hinged rungs 118 that are not in the secured position define a large window 204 through the ladder 100 that extends laterally between the side rails 106. The mechanic is able to access a working zone 208 on the exterior surface 110 of the fuselage 18 through the window 204. The ladder 100 is positioned relative to the fuselage 18 such that a joint or seam 206 in the fuselage 18 is located in the working zone 208 between the side rails 106, although behind the ladder 100 relative to the mechanic. The window 204 is large enough to allow the mechanic to perform a work task on the working zone 208 through the window 204 without obstruction by the rungs 114, 118. The work task may involve drilling, countersinking, installing fasteners (e.g., rivets or the like) along or proximate to the joint 206. Since the working zone 208 is directly behind the ladder 100, the mechanic does not need to reach outside of the frame of the ladder 100 to access the working zone 208, so the mechanic can adopt a comfortable posture and can accurately and efficiently work on the fuselage 18.

In an example operation, the mechanic may perform a work task by reaching through two rungs, such as two adjacent hinged rungs 118 in the secured position. Then, the mechanic may lift one of the hinged rungs 118 to increase the size of the window through the ladder 100 for accessing the exterior surface 110 of the fuselage 18. Upon completing a work task in the working zone 208 within the window, the mechanic may subsequently pivot the hinged rung 118 back to the secured position and lift an adjacent hinged rung 118 from the secured position to the retracted position to move the window that is defined by the ladder 100 along the length of the ladder 100. The mechanic again performs the work task through the ladder 100 until completing the work task. Therefore, the mechanic may move upwards or downwards along the ladder 100 to perform the work task along different segments of the joint 206 in the fuselage 18 by repeatably lifting and then closing adjacent hinged rungs 118 to provide access to the joint 206 behind the ladder 100.

Figure 4:
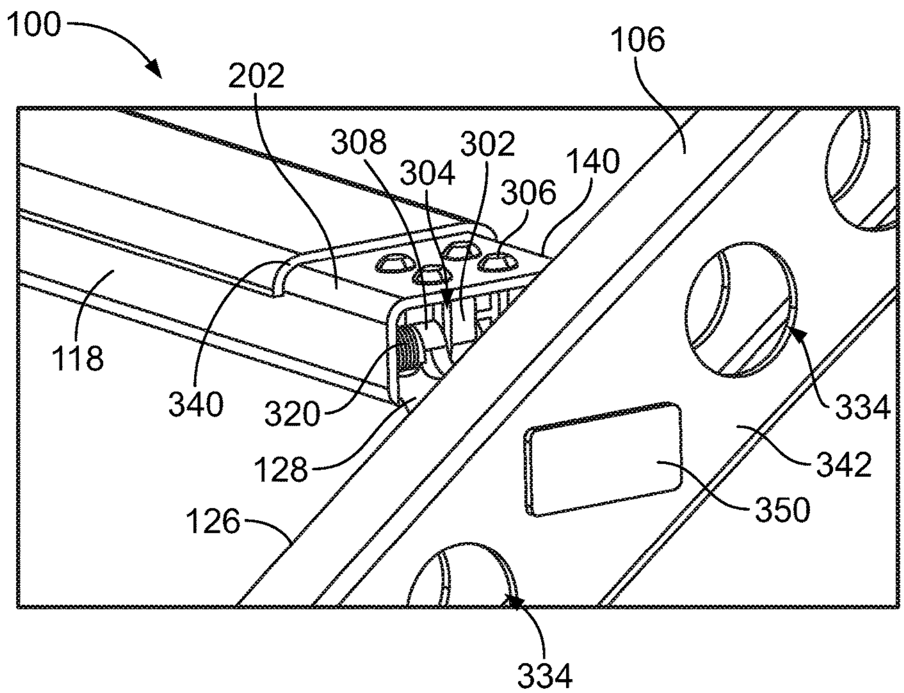
FIG. 4 is a perspective view of a portion of the ladder, according to an embodiment of the present disclosure.
Figure 5:
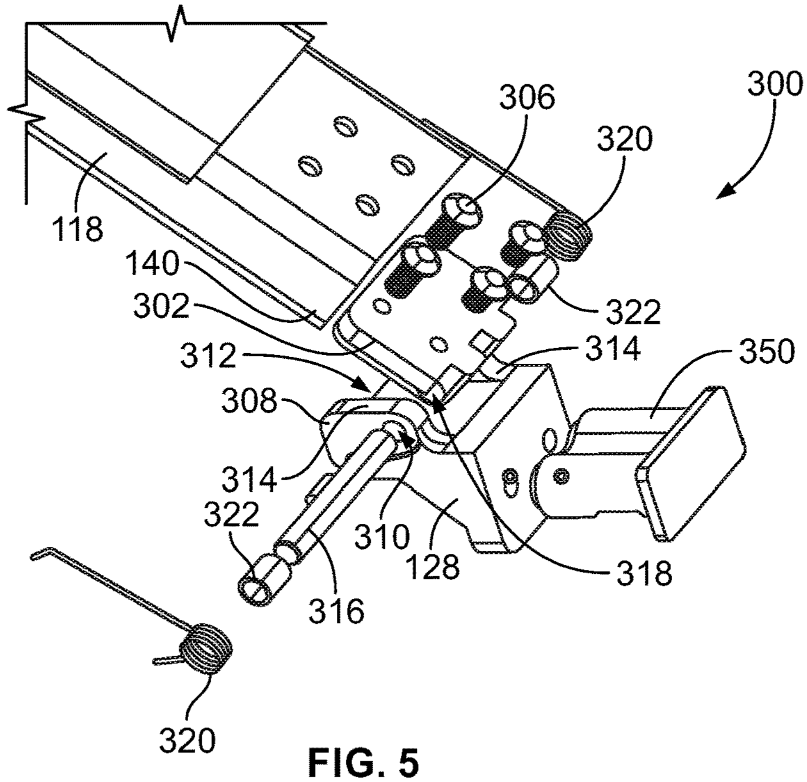
FIG. 5 is an exploded perspective view of a first end of a hinged rung and a spring-loaded hinge system of the ladder, according to an embodiment of the present disclosure.
Figure 6:
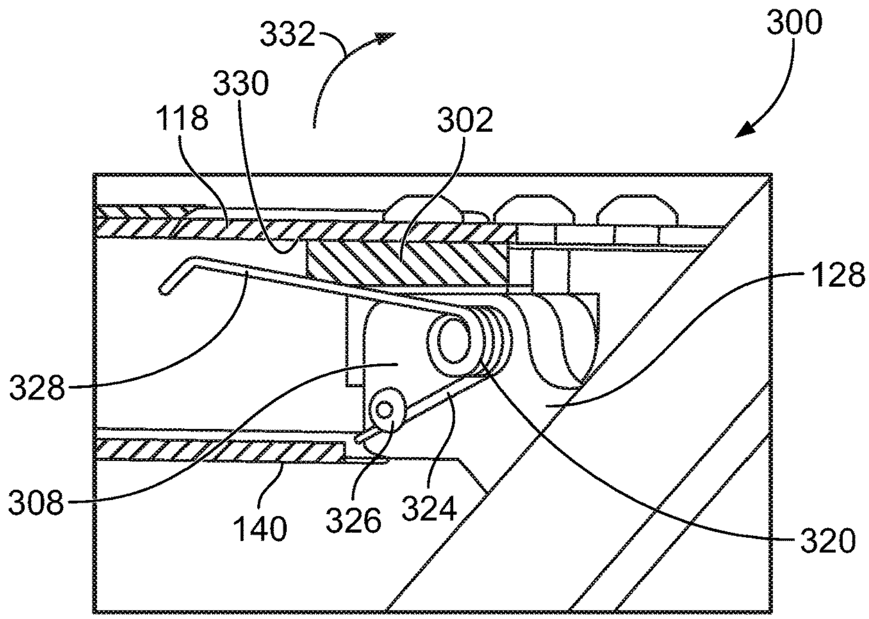
FIG. 6 shows an assembled, partial cross-sectional view of the first end of the hinged rung and the spring-loaded hinge system, according to an embodiment of the present disclosure.

FIG. 4 is a perspective view of a portion of the ladder 100 according to an embodiment of the present disclosure. The illustrated portion shows the first end 140 of one of the hinged rungs 118 coupled to one of the side rails 106 via the pivoting rung support 128. In an embodiment, the pivoting rung support 128 is a component of a spring-loaded hinge system 300 (shown in FIG. 5) designed to apply a pre-loaded force that assists the hinged rung 118 in pivoting from the secured position to the retracted position. The hinged rung 118 is shown in the secured position relative to the side rail 106. FIG. 5 is an exploded perspective view of the first end 140 of the hinged rung 118 and the spring-loaded hinge system 300 according to an embodiment of the present disclosure. FIG. 6 shows an assembled, partial cross-sectional view of the first end 140 of the hinged rung 118 and the spring-loaded hinge system 300 according to an embodiment of the present disclosure.

In an embodiment, the hinged rung 118 is at least partially hollow, and includes a hinge plate 302 that is mounted within a hollow cavity 304 of the hinged rung 118 via fasteners 306, such as bolts or the like. The pivoting rung support 128 disposed along the inner side 126 of the side rail 106 includes a flanged end portion 308 that has an aperture 310 therein. The first end 140 of the hinged rung 118 is pivotally coupled to the flanged end portion 308.

As shown in FIG. 5, the flanged end portion 308 defines a channel 312 between two ears 314 of the flanged end portion 308. The aperture 310 is defined through each of the ears 314. The hinge plate 302 is received within the channel 312. The spring-loaded hinge system 300 includes a spring-loaded pin 316 that is received within the aperture 310 and extends at least partially through a hole 318 in the hinge plate 302 to pivotally couple the hinged rung 118 to the pivoting rung support 128. The pin 316 is spring-loaded because torsion springs 320 are loaded onto ends of the pin 316, optionally with a corresponding bushing 322 disposed between the spring 320 and the pin 316. The torsion springs 320 are configured to engage both the pivoting rung support 128 and the hinged rung 118 to bias the hinged rung 118 towards the retracted position. When the hinged rung 118 is assembled to the side rail 106 as shown in FIG. 4, the hinge plate 302, the pin 316, the torsion springs 320, and the flanged end portion 308 of the pivoting rung support 128 are disposed within the hollow cavity 304 of the hinged rung 118.

In FIG. 6, the hinged rung 118 and the hinge plate 302 are shown in cross-section to illustrate the components within the hollow cavity 304. A tail end 324 of the torsion spring 320 is fixed in position relative to the flanged end portion 308 of the pivoting rung support 128 via a pin 326. The pin 326 may be a dowel pin, a bolt or other type of fastener, or the like. The pin 326 maintains tension in the torsion spring 320. An arm 328 at the opposite end of the torsion spring 320 is configured to engage the hinge plate 302 and/or an interior surface 330 of the hinged rung 118 to exert a spring-force on the hinged rung 118 in a retracting direction 332 towards the retracted position. The arm 328 engages the hinge plate 302 in the illustrated embodiment. The springs 320 provide a lift-assist when the mechanic moves the hinged rung 118 to the retracted position and also retains the hinged rung 118 in the retracted position until the mechanic manually moves the hinged rung 118 back to the secured position.

In an alternative embodiment, a different type of spring, such as a leaf spring or a coil spring, may be used to provide a lift-assist for the hinged rung 118 instead of the torsion springs 320. In yet another embodiment, the pin 316 is not spring-loaded and the hinged rung 118 is not biased towards the retracted position. For example, the hinged rung 118 moved to the retracted position by hand may remain in the retracted position due to the angle of the hinged rung 118 at the retracted position. The hinged rung 118 may pivot more than 90° from the secured position to the retracted position, and may rest on the side rail 106 or another stop surface to remain in the retracted position.

Referring now back to FIG. 4, the hinged rung 118 and the side rail 106 are composed of a fiber-reinforced polymer composite material, such as carbon fiber, in an embodiment. The fiber-reinforced polymer composite material is referred to herein as a fiber composite material. Although only one hinged rung 118 and one of the side rails 106 are shown in FIG. 4, optionally all of the hinged rungs 118, all of the fixed rungs 114 (shown in FIG. 2), and both side rails 106 are composed of the fiber composite material. The fiber composite material is both light-weight and strong, such that the rungs 114, 118 can support up to or exceeding 500 pounds. The side rail 106 in FIG. 4 also includes multiple weight reduction holes 334 along the length of the side rail 106 to further reduce the weight of the side rail 106. Although not shown in FIG. 4, the fixed rungs 114, the hinged rungs 118, and the other side rail 106 may also include weight reduction holes for reducing the weight of the ladder 100. The side rail 106 is hollow, similar to the hinged rung 118. The hardware components, such as the fasteners 306, the hinge plate 302, and the pivoting rung support 128, may be composed of a relatively lightweight metal, such as titanium. Due to the weight considerations, the ladder 100 according to one or more embodiments described herein weighs 35 pounds, which is almost half the weight of some known ladders used for aircraft assembly. As a result, the ladder 100 can be comfortably handled (e.g., carried and set up) by a single mechanic without occupying the time and effort of multiple mechanics.

In an embodiment, the top surface 202 of the hinged rung 118 includes an anti-skid pad 340 that is configured to increase the friction between the top surface 202 and the mechanic's feet and hands for reducing slippage. The anti-skid pad 340 may be bonded to the top surface 202 of the hinged rung 118. For example, the anti-skid pad 340 and the hinged rung 118 may be co-cured at a temperature between about 120° F. and about 160° F. Alternatively, the anti-skid pad 340 may be bonded to the rung 118 via the use of fasteners or an adhesive. In one embodiment, the anti-skid pad 340 is composed of polyurethane that has a durometer (e.g., hardness) between about 60 and about 80, such as about 70. The anti-skid pad 340 may have a thickness between about 0.03 inches and about 0.3 inches, such as between about 0.06 inches and 0.13 inches. Although only one hinged rung 118 is shown in FIG. 4, the other hinged rungs 118 and at least some of the fixed rungs 114 may also include respective anti-skid pads 340, as shown in FIG. 2.

In an embodiment, the pivoting rung support 128 is mounted to the side rail 106 via a clamp fitting 350 that engages an outer side 342 of the side rail 106. The support fitting 350 is described in more detail below with reference to FIGS. 10 and 11.

Figure 7:
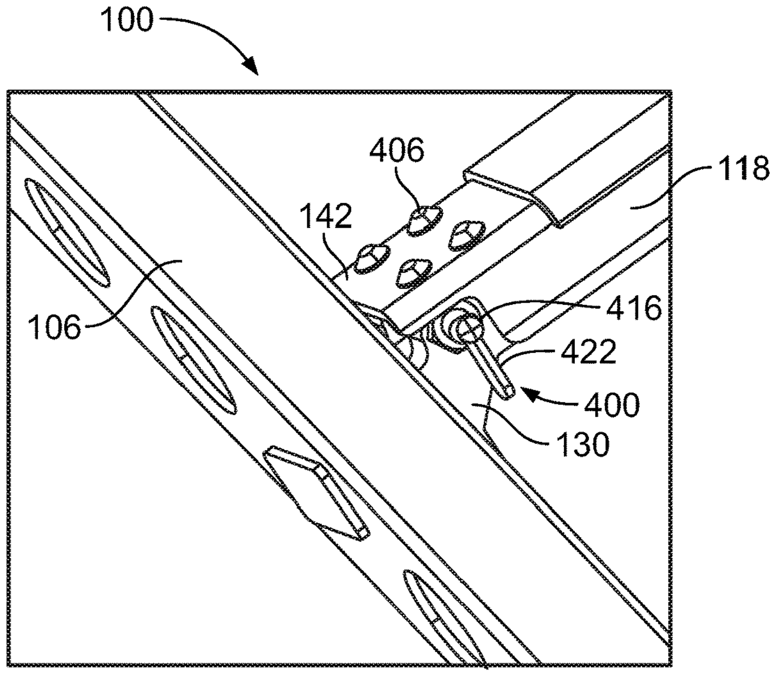
FIG. 7 is a perspective view of another portion of the ladder, according to an embodiment of the present disclosure.

FIG. 7 is a perspective view of another portion of the ladder 100 according to an embodiment of the present disclosure. The illustrated portion shows the second end 142 of one of the hinged rungs 118 secured to one of the side rails 106 via the locking rung support 130. It is understood that the side rail 106 shown in FIG. 7 is not the same side rail 106 that is shown in FIGS. 4-6. The hinged rung 118 is shown in the secured position relative to the side rail 106 in FIG. 7, such that the hinged rung 118 engages the locking rung support 130. The hinged rung 118 can support the weight of the mechanic when in the secured position. In an embodiment, the locking rung support 130 is a component of an easy release and self-locking latching mechanism 400 that is designed to allow the hinged rung 118 to automatically lock in place upon reaching the secured position and also to allow for simple release of the hinged rung 118 from the locked state via a release switch 422.

Figure 8:
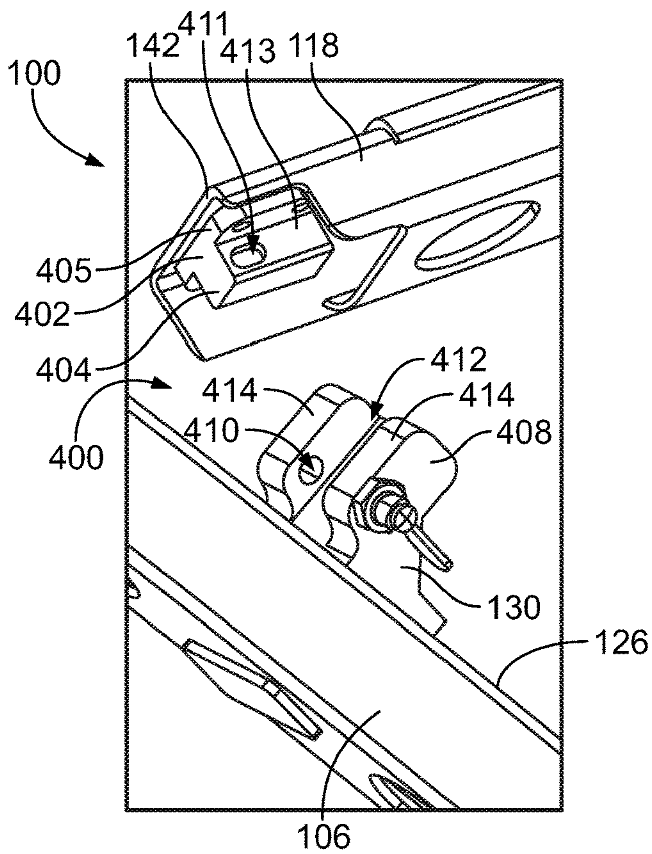
FIG. 8 is a perspective view of the ladder showing a second end of the hinged rung spaced apart from a locking rung support in an intermediate position.

Additional reference is made to FIG. 8, which is a perspective view of the ladder 100 showing the second end 142 of the hinged rung 118 spaced apart from the locking rung support 130 in an intermediate position. The second end 142 of the hinged rung 118 includes a support fitting 402 that is mounted within the hollow cavity 304 of the hinged rung 118 via fasteners 406, such as bolts or the like. The support fitting 402 includes a mounting flange 405 and a central member 404. The mounting flange 405 engages the hinged rung 118. The central member 404 extends downward from the mounting flange 405 and defines a slot 411 along a side 413 thereof.

In an embodiment, the second end 142 of the hinged rung 118 is releasably secured to the locking rung support 130 via a latch 416 of the latching mechanism 400. The locking rung support 130 disposed along the inner side 126 of the side rail 106 includes a flanged end portion 408 that has an aperture 410. The flanged end portion 408 defines a channel 412 between two ears 414 of the flanged end portion 408. The aperture 410 is defined through both of the ears 414. Optionally, the locking rung support 130 may be identical to the pivoting rung support 128 shown in FIG. 5. The latch 416 includes a spring-loaded pin 418 that extends through the aperture 410 and at least partially into the channel 412 between the ears 414. The spring-loaded pin 418 is axially loaded such that the pin 418 is configured to move along an axis of the pin 418 relative to the locking rung support 130. The latch 416 in the illustrated embodiment extends through the aperture 410 of only one of the ears 414 of the locking rung support 130, but the latching mechanism 400 optionally may include a second latch that extends through the aperture 410 of the other ear 414, mirroring the first latch 416. When the hinged rung 118 is moved to the secured position, the central member 404 of the support fitting 402 is received within the channel 412. In addition, the spring-loaded pin 418 of the latch 416 is configured to be received within the slot 411 of the support fitting 402 to automatically secure the hinged rung 118 in the secured position.

Figure 9:
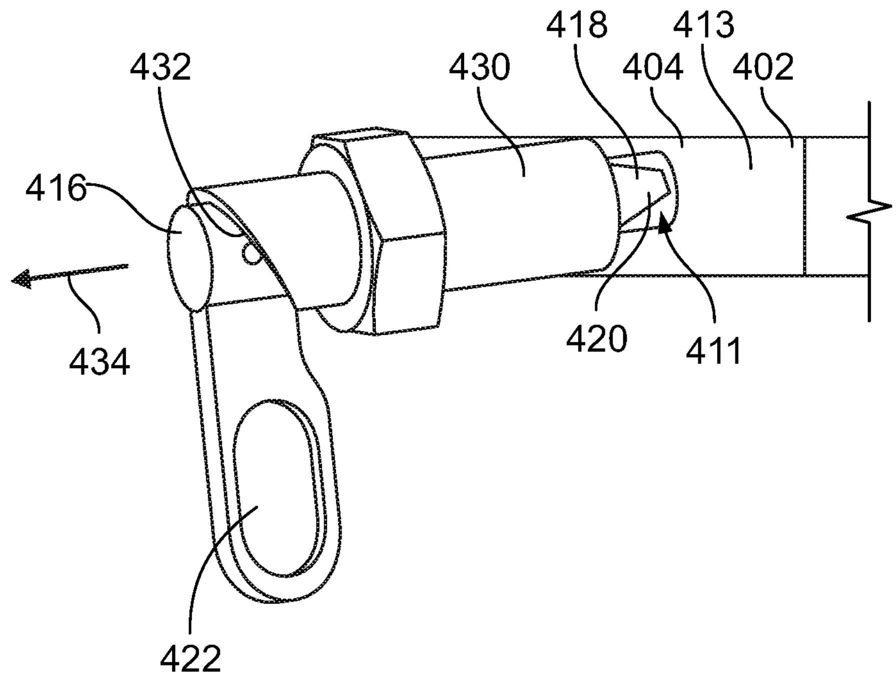
FIG. 9 shows a close-up perspective view of a latch and a side of a support fitting when the hinged rung is in a secured position, according to an embodiment of the present disclosure.

FIG. 9 shows a close-up perspective view of the latch 416 and the side 413 of the support fitting 402 when the hinged rung 118 is in the secured position according to an embodiment of the present disclosure. The spring-loaded pin 418 of the latch 416 has a tapered tip 420. As the central member 404 of the support fitting 402 is lowered into the channel 412, the central member 404 abuts against the tapered tip 420 and forces the pin 418 to retract at least partially into a sleeve 430 of the latch 416. The sleeve 430 surrounds a spring (not shown) that biases the pin 418 towards the channel 412. Once the slot 411 of the central member 404 aligns with the pin 418, the pin 418 resiles into the channel 412 and is received within the slot 411. Engagement between the pin 418 and edges of the slot 411 releasably lock the hinged rung 118 in the secured position.

The latch 416 further includes a release switch 422 operably coupled to the spring-loaded pin 418 such that actuation of the release switch 422 retracts the spring-loaded pin 418 out of the slot 411 to release the hinged rung 118 from the locking rung support 130. In the illustrated embodiment, the release switch 422 is a rotatable lever or handle. The sleeve 430 has a cambered end 432 that engages the lever 422. As the lever 422 is rotated, the cambered end 432 forces the lever 422 and the pin 418 in a releasing direction 434, releasing the hinged slot 118 from the locking rung support 130. The spring-force on the pin 418 moves the latch 416 back towards the channel 412 when the actuation force on the lever 422 is removed. In other embodiments, the release switch 422 may be a button, a different type of lever, or the like.

In an alternative embodiment, the support fitting 402 on the hinged rung 118 may include a spring-loaded pin instead of the locking rung support 130. The release switch 422 on the locking rung support 130 may be used for pushing the spring-loaded pin on the support fitting 402 towards a retracted position instead of pulling the spring-loaded pin 418 towards a retracted state.

Figure 10:
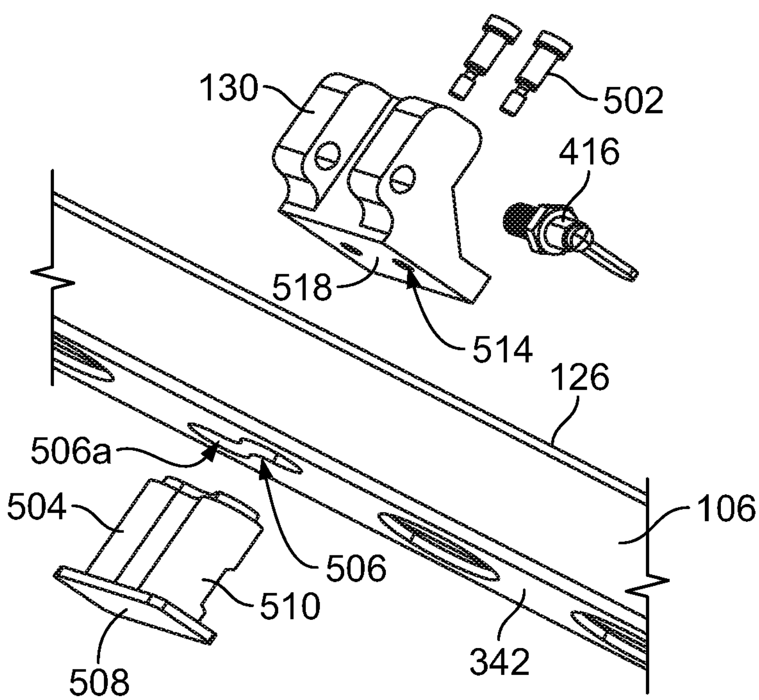
FIG. 10 is an exploded lower view of a portion of a side rail of the ladder, according to an embodiment of the present disclosure.
Figure 11:
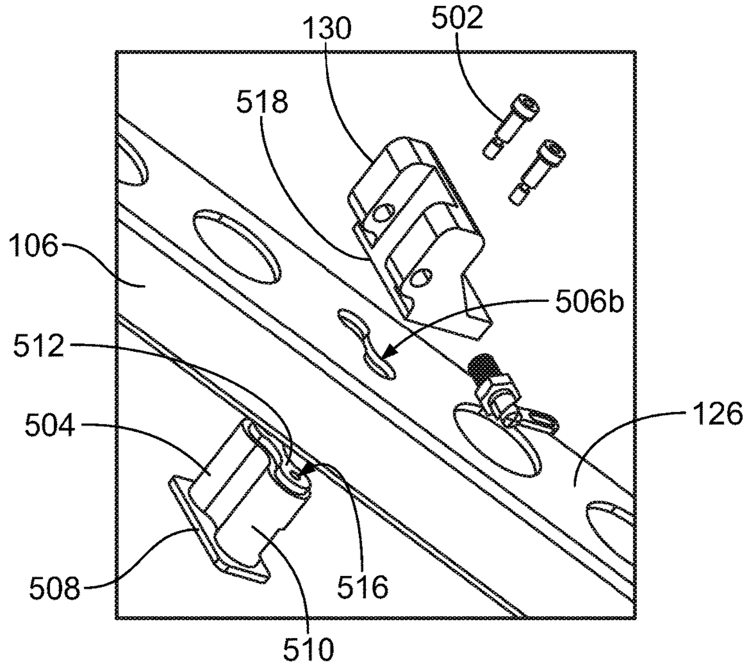
FIG. 11 is an exploded upper view of the portion of the side rail of the ladder, according to an embodiment of the present disclosure.

FIG. 10 is an exploded lower view of a portion of the side rail 106 of the ladder 100, according to an embodiment of the present disclosure. FIG. 11 is an exploded upper view of the same portion of the side rail 106 of the ladder 100, according to an embodiment of the present disclosure. FIGS. 10 and 11 show the side rail 106, the locking rung support 130, the latch 416, fasteners 502, and a clamp fitting 504. The clamp fitting 504 is used to mount the locking rung support 130 to the side rail 106 in a way that increases the structural integrity and longevity of the ladder 100 (shown in FIG. 2). In an embodiment, the side rail 106 defines a fitting opening 506 that extends through the side rail 106 between the inner side 126 and the outer side 342. The locking rung support 130 aligns with the fitting opening 506 along the inner side 126. The clamp fitting 504 is received into the fitting opening 506 through the outer side 342 of the side rail 106.

The clamp fitting 504 includes a base 508 and an insert 510 extending from the base 508. The base 508 is generally planar and is configured to engage and abut against the outer side 342 of the side rail 106. The insert 510 is received into the fitting opening 506. The insert 510 is fastened to the locking rung support 130, such that the side rail 106 is sandwiched between the locking rung support 130 and the base 508 of the clamp fitting 504. For example, the fasteners 502 are inserted through apertures 514 in the locking rung support 130, through the fitting opening 506, and are received into apertures 516 in the insert 510. In an embodiment, the insert 510 includes a boss 512 at a distal end of the insert 510. The boss 512 may be coplanar with the inner side 126 of the side rail 106, such that the boss 512 engages a bottom surface 518 of the locking rung support 130.

In an embodiment, the insert 510 of the clamp fitting 504 has a lemniscate shape that provides increased contact surface with the side rail 106. The lemniscate shape may resemble a dumbbell, an hourglass, and/or a dog bone. The fitting opening 506 in the side rail 106 has a complementary lemniscate shape as the insert 510. The clamp fitting 504 is configured to provide load distribution at the coupling interface between the rung support 130 and the side rail 106. The clamp fitting 504 may also reduce relative movement of the rung support 130 relative to the side rail 106, such as rubbing, which may increase the longevity of the ladder 100 by reducing degradation of the fiber composite material.

In an embodiment, the fitting opening 506 at an outer end 506*a* shown in FIG. 10 has a larger size than the fitting opening 506 at an inner end 506*b* shown in FIG. 11. The insert 510 of the clamp fitting 504 extends through the outer end 506*a*. Only the boss 512 of the clamp fitting 504, not the remainder of the insert 510, extends through the inner end 506*b*. The size of the outer end 506*a* complements the size of the insert 510, and the size of the inner end 506*b* complements the size of the boss 512. The inner end 506*b* is too small to receive the remainder of the insert 510 therethrough, so a shoulder between the boss 512 and the remainder of the insert 510 may engage the side rail 106 around the inner end 506*b*.

Although only one clamp fitting 504 is shown in FIGS. 10 and 11, it is recognized that all of the hinged rungs 118 and all of the fixed rungs 114 may include clamp fittings similar to or identical to the clamp fitting 504. For example, the clamp fitting 350 shown in FIG. 5 that mounts to the pivoting rung support 128 may be similar to or identical to the clamp fitting 504.

Figure 12:
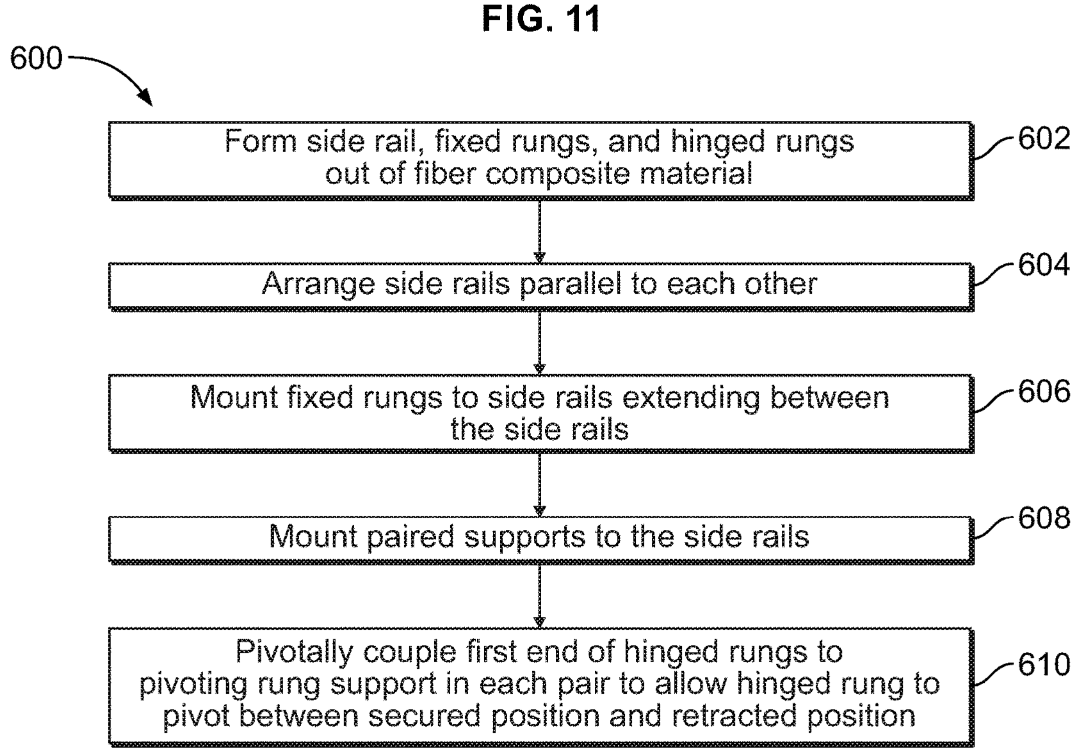
FIG. 12 is a flow chart of a method of manufacturing an ergonomic ladder, according to an embodiment of the present disclosure.

FIG. 12 is a flow chart of a method 600 of manufacturing or assembling an ergonomic ladder, according to an embodiment of the present disclosure. Referring to FIGS. 2-11, the method 600 begins at 602, at which a pair of generally curved side rails 106, a plurality of fixed rungs 114, and a plurality of hinged rungs 118 are formed out of a fiber composite material, such as carbon fiber. The side rails 106 may be curved. Optionally, the fixed rungs 114 and the hinged rungs 118 are formed to have respective top surfaces 202 that are generally planar and have widths of at least three inches. For example, the fixed rungs 114 may be identical to the hinged rungs 118 during the formation process. The forming may include bonding an anti-skid pad 340 to the top surface 202 of each of the fixed rungs 114 and the hinged rungs 118. The anti-skid pads 340 may have a durometer between about 60 and about 80.

At 604, the pair of side rails 106 are arranged to extend parallel to each other in a spaced apart manner. At 606, the fixed rungs 114 are mounted to the side rails 106 such that the fixed rungs 114 extend between the side rails 106. The fixed rungs 114 provide structural integrity to the ladder 100 by forming a secure frame that holds the side rails 106 in place relative to each other.

At 608, a plurality of pairs of rung supports 128, 130 are mounted to the side rails 106 such that the rung supports 128, 130 are spaced apart from the fixed rungs 114 along lengths of the side rails 106. The rung supports 128, 130 in each pair 132 of rung supports 128, 130 are horizontally aligned with each other and disposed on respective inner sides 126 of the side rails 106. Optionally, the rung supports 128, 130 are mounted to the side rails 106 by fastening the rung supports 128, 130 to associated clamp fittings 350, 504. The clamp fittings 350, 504 each include a base 508 engaging an outer side 342 of a corresponding one of the side rails 106 and an insert 510 that extends from the base 508. The insert 510 is received within a fitting opening 506 defined through the corresponding side rail 106. The inserts 510 is fastened to one of the rung supports 128, 130 that is disposed along the inner side 126 of the side rail 106, such that the side rail 106 is sandwiched between the rung support 128, 130 and the clamp fitting 350, 504. The inserts 510 of the clamp fittings 350, 504 and the fitting openings 506 in the side rails 106 may have lemniscate shapes.

At 610, a first end 140 of each of the hinged rungs 118 is pivotally coupled to a first rung support 128 in the pair 132 of rung supports 128, 130 associated with the respective hinged rung 118. Each hinged rung 118 is pivotal relative to the side rails 106 between a secured position and a retracted position. In the secured position, an opposite second end 142 of the hinged rung 118 engages a second rung support 130 in the pair 132, and the hinged rung 118 can be used as a typical ladder rung. In the retracted position, the second end 142 of the hinged rung 118 is spaced apart from the second rung support 130, creating a large window or opening in the ladder 100 between adjacent intact rungs on either side of the retracted hinged rung 118, which allows a mechanic to access a working zone directly behind the ladder 100 and between the side rails 106.

Figure 13:
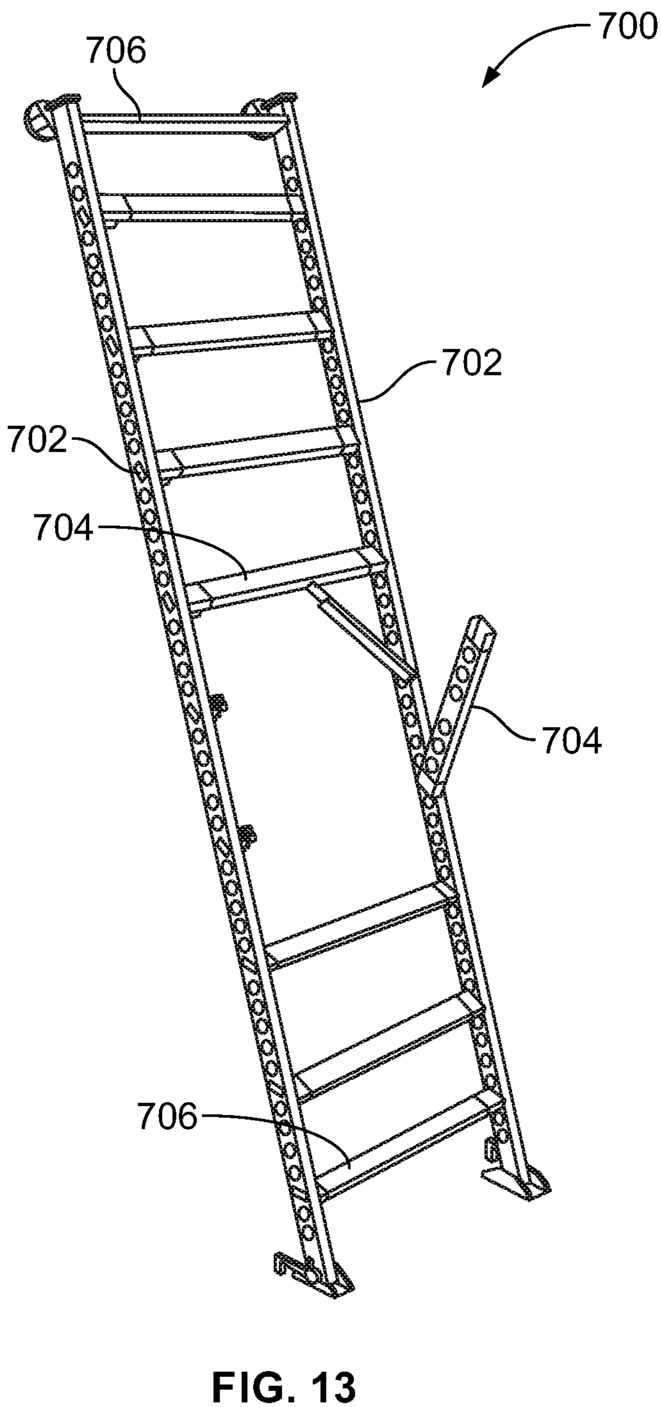
FIG. 13 is a perspective view of an ergonomic ladder, according to an alternative embodiment of the present disclosure.

FIG. 13 is a perspective view of an ergonomic ladder 700 according to an alternative embodiment of the present disclosure. Like the ladder 100 shown in FIGS. 2-11, the ladder 700 includes side rails 702 and both hinged rungs 704 and fixed rungs 706 that extend between the side rails 702. The hinged rungs 704 pivot between secured and retracted positions. The primary difference between the ladder 700 and the ladder 100 is that side rails 702 are generally linear instead of curved. Thus, the ladder 700 may be used for working on non-curved structures, such as linear walls of buildings or the like.

While various spatial and directional terms, such as top, bottom, front, rear, lateral, horizontal, vertical, and the like, may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, the term "controller," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A ladder, comprising:

a pair of side rails arranged in a spaced apart manner and extending parallel to one another from a lower end of the ladder to an upper end of the ladder;

a plurality of fixed rungs disposed between the side rails;

a plurality of pairs of rung supports, the rung supports in each of the pairs of rung supports being horizontally aligned with each other and disposed on respective inner sides of the side rails, the rung supports spaced apart from the fixed rungs along lengths of the side rails, wherein each rung support includes a flanged end portion having an aperture therein; and a plurality of hinged rungs, each hinged rung being associated with a respective pair of said rung supports, wherein each hinged rung has a first end and a second end opposite the first end, the first end pivotally coupled to the flanged end portion of a first rung support in the respective pair of rung supports enabling the hinged rung to pivot between a secured position and a retracted position, wherein, in the secured position, the second end of the hinged rung engages a second rung support in the respective pair of rung supports, and, in the retracted position, the second end is spaced apart from the second rung support wherein the hinged rung pivots out of a plane defined by the parallel side rails as the hinged rung transitions from the secured position towards the retracted position, and the second end of the hinged rung is spaced apart from both of the side rails when in the retracted position, wherein at least one of the fixed rungs is located below all of the hinged rungs at or proximate to the lower end of the ladder.

2. The ladder of claim 1, wherein the second end of each hinged rung releasably latches to the flanged end portion of the second rung support in the respective pair of rung supports when in the secured position.

3. The ladder of claim 1, further comprising a frictional foot on an upper end of each of the side rails, the frictional foot configured for engagement with an upper surface of an aircraft fuselage.

4. The ladder of claim 1, wherein a first fixed rung of the fixed rungs is located at or proximate to the upper end of the ladder, a second fixed rung of the fixed rungs is located at or proximate to the lower end of the ladder, and the hinged rungs are located between the first and second fixed rungs along the length of the ladder.

5. The ladder of claim 1, wherein the plurality of fixed rungs includes multiple fixed rungs disposed between the side rails along a lower portion of the pair of side rails, the plurality of hinged rungs disposed between the side rails along an upper portion of the pair of side rails that is discrete from the lower portion along the lengths of the side rails.

6. The ladder of claim 1, wherein one or more of the pair of side rails, the plurality of fixed rungs, or the plurality of hinged rungs are composed of a fiber-reinforced polymer composite material.

7. The ladder of claim 1, wherein the hinged rungs and the fixed rungs include anti-skid pads bonded to respective top surfaces of the hinged rungs and the fixed rungs, the anti-skid pads composed of polyurethane and having a durometer between about 60 and about 80.

8. The ladder of claim 1, wherein the side rails include the inner sides on which the pairs of rung supports are disposed and opposite outer sides, the side rails defining fitting openings that extend through the side rails between the inner sides and the outer sides, the ladder further including a plurality of clamp fittings that are received into the fitting openings through the outer sides of the side rails, each of the clamp fittings including a base that engages the outer side of one of the side rails and an insert extending from the base into a corresponding one of the fitting openings, the inserts of the clamp fittings being fastened to the rung supports.

9. The ladder of claim 8, wherein the fitting openings in the side rails and the inserts of the clamp fittings have lemniscate shapes.

10. The ladder of claim 1, wherein the first rung support of each of the pairs of rung supports includes a torsion spring that engages the first end of the associated hinged rung and biases the hinged rung towards the retracted position.

11. The ladder of claim 1, wherein each of the hinged rungs pivots greater than 90° from the secured position to the retracted position.

12. The ladder of claim 1, wherein the side rails are generally curved.

13. The ladder of claim 1, wherein the pair of side rails includes a first side rail and a second side rail, wherein the first end of each of the hinged rungs is pivotally coupled to the corresponding first rung support at the first side rail such that all of the hinged rungs pivot in a common direction from the secured position to the retracted position.

14. A method of manufacturing a ladder comprising:

forming a pair of side rails, a plurality of fixed rungs, and a plurality of hinged rungs out of a fiber-reinforced polymer composite material, each of the hinged rungs having a first end and a second end opposite the first end;

arranging the pair of side rails to extend parallel to each other in a spaced apart manner from a lower end of the ladder to an upper end of the ladder;

mounting the fixed rungs to the side rails such that the fixed rungs extend between the side rails;

mounting a plurality of pairs of rung supports to the side rails such that the rung supports are spaced apart from the fixed rungs along lengths of the side rails, the rung supports in each of the pairs of rung supports being horizontally aligned with each other and disposed on respective inner sides of the side rails; and pivotally coupling the first end of each of the hinged rungs to a first rung support in the pair of rung supports associated with the respective hinged rung to enable the hinged rung to pivot relative to the side rails between a secured position and a retracted position, wherein, in the secured position, the second end of the hinged rung engages a second rung support in the respective pair of rung supports, and, in the retracted position, the second end is spaced apart from the second rung support, wherein the hinged rung pivots out of a plane defined by the parallel side rails as the hinged rung transitions from the secured position towards the retracted position, and the second end of the hinged rung is spaced apart from both of the side rails when in the retracted position, wherein the mounting of the fixed rungs includes mounting at least one of the fixed rungs at a location below all of the hinged rungs at or proximate to the lower end of the ladder.

15. The method of claim 14, wherein the forming includes bonding an anti-skid pad to top surfaces of the fixed rungs and the hinged rungs, the anti-skid pad having a durometer between about 60 and about 80.

16. The method of claim 14, wherein the fixed rungs and the hinged rungs are formed to have respective top surfaces that are generally planar and have widths of at least three inches.

17. The method of claim 14, wherein the mounting the pairs of rung supports includes fastening the rung supports along the inner sides of the side rails to associated clamp fittings, the clamp fittings each including a base engaging an outer side of a corresponding one of the side rails and an insert that extends from the base and is received within a fitting opening defined through the corresponding side rail.

18. The method of claim 17, wherein the fitting openings in the side rails and the inserts of the clamp fittings have lemniscate shapes.

19. A ladder, comprising:

a pair of side rails arranged in a spaced apart manner and extending parallel to one another;

a plurality of fixed rungs disposed between the side rails;

a plurality of pairs of rung supports, the rung supports in each of the pairs of rung supports being horizontally aligned with each other and disposed on respective inner sides of the side rails, the rung supports spaced apart from the fixed rungs along lengths of the side rails, wherein each rung support includes a flanged end portion having an aperture therein; and a plurality of hinged rungs, each hinged rung being associated with a respective pair of said rung supports, wherein each hinged rung has a first end and a second end opposite the first end, the first end pivotally coupled to the flanged end portion of a first rung support in the respective pair of rung supports enabling the hinged rung to pivot between a secured position and a retracted position, wherein, in the secured position, the second end of the hinged rung engages a second rung support in the respective pair of rung supports, wherein the hinged rung pivots out of a plane defined by the parallel side rails as the hinged rung transitions from the secured position towards the retracted position, and the second end of the hinged rung is spaced apart from both of the side rails when in the retracted position.

20. The ladder of claim 19, wherein the second end of each hinged rung includes a support fitting that is configured to automatically releasably lock to the second rung support in the respective pair of rung supports via a latch when the hinged rung is moved to the secured position.

21. The ladder of claim 20, wherein the latch includes a spring-loaded pin that extends through the aperture in the flanged end portion of the second rung support, the support fitting at the second end of each hinged rung includes a slot configured to receive the spring-loaded pin therein to lock the hinged rung to the second rung support, the latch further including a release switch operably coupled to the spring-loaded pin such that actuation of the release switch retracts the spring-loaded pin out of the slot to release the hinged rung from the second rung support.

22. The ladder of claim 19, wherein the first rung support of each of the pairs of rung supports includes a torsion spring that engages the first end of the associated hinged rung and biases the hinged rung towards the retracted position.

23. The ladder of claim 19, wherein at least one of the fixed rungs is located below all of the hinged rungs at or proximate to a lower end of the ladder.

* * * * *